Aug. 22, 1933.    R. SCHLEMM    1,923,590
BREAD TOASTER
Filed June 2, 1927    5 Sheets-Sheet 1

Witness
Martin H. Olsen

Inventor
Robert Schlemm
By J. L. Newton
Atty.

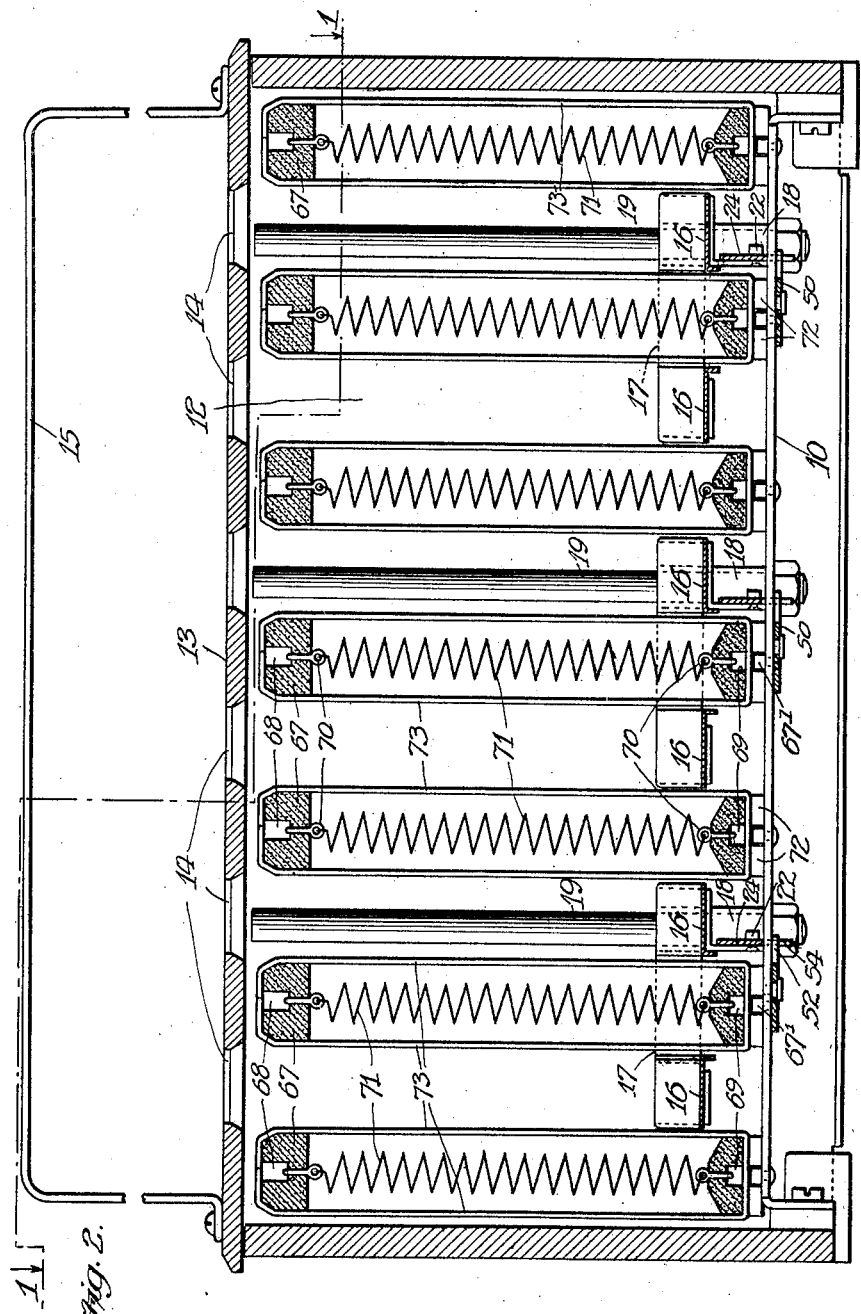

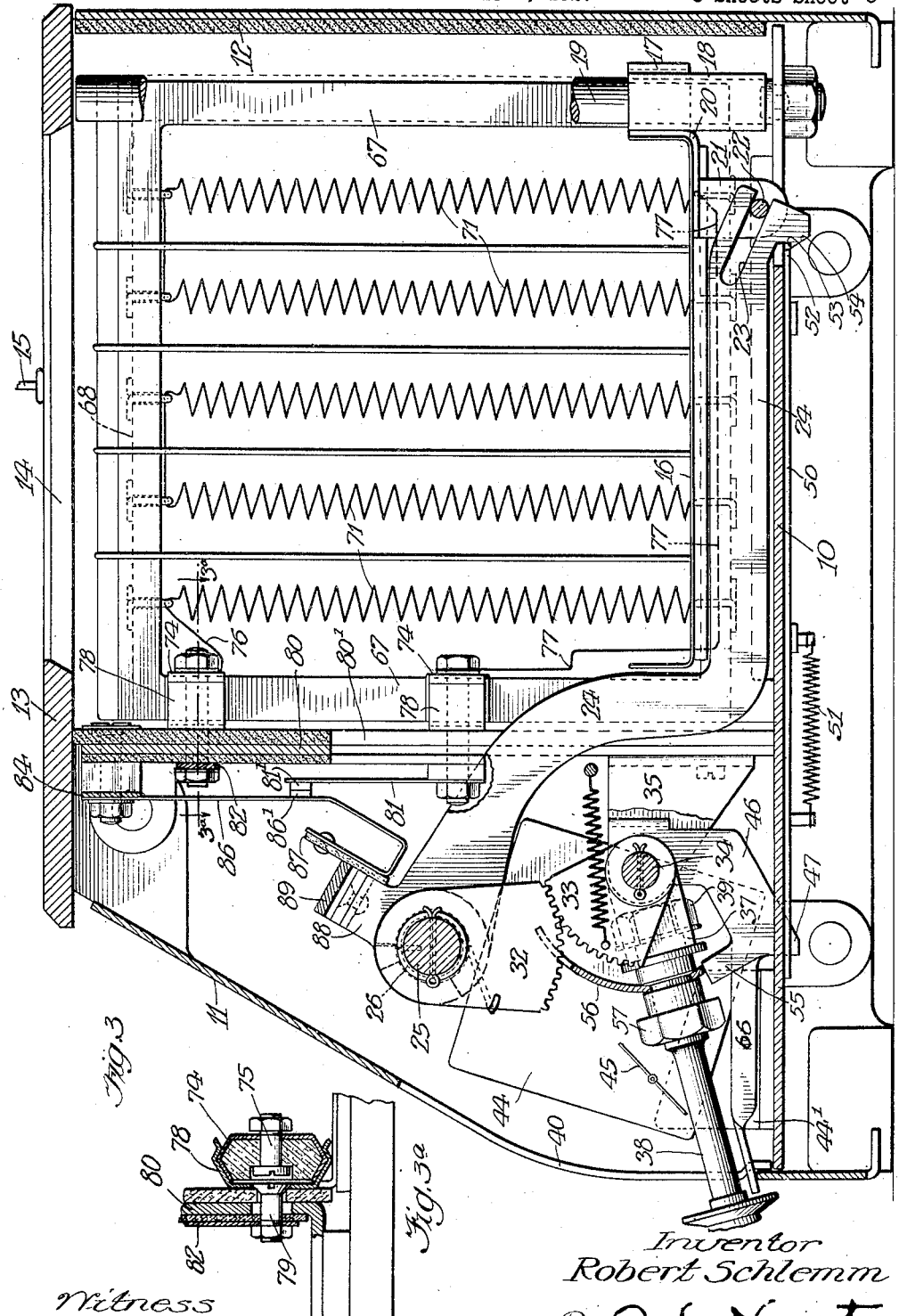

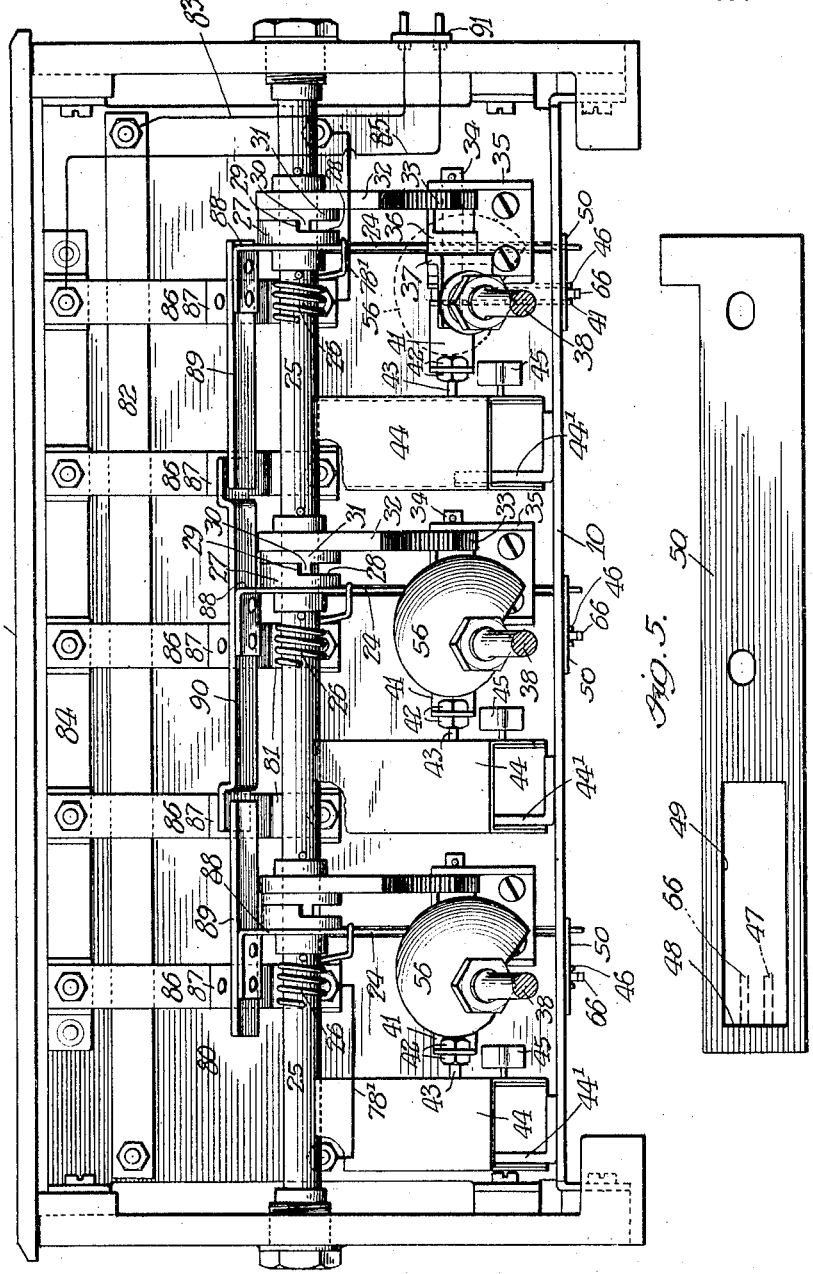

Aug. 22, 1933.  R. SCHLEMM  1,923,590
BREAD TOASTER
Filed June 2, 1927  5 Sheets-Sheet 5

Witness
Martin H. Olsen.

Inventor
Robert Schlemm
By J. I. Newton
Atty.

Patented Aug. 22, 1933

1,923,590

UNITED STATES PATENT OFFICE 1,923,590

BREAD TOASTER

Robert Schlemm, Chicago, Ill.

Application June 2, 1927. Serial No. 196,071

5 Claims. (Cl. 219—19)

My invention relates to improvements in bread toasters and has for its primary object the provision of a device of this character which is compact in construction, and flexible and economical in operation.

Another object of the invention is to provide a construction of this character readily made up in replaceable sections, each independent of all others and therefore capable of operation should any of the others fail.

Another object of the invention is to provide a construction of this character in which all of the working parts may be readily removed and replaced to facilitate adjustments and repairs.

Another object of the invention is to provide a construction of this character in which the heating elements are all in one line and arranged in sets, the adjacent sets comprising end members common to both, the switches for the heating elements being so arranged and interlocked that no heater operates longer than is absolutely necessary, thus effecting economy in operation.

Other objects will appear hereinafter.

In general the objects of the invention are attained by providing a plurality of adjacent electrical heating coils arranged in adjacent sets of three, with spaces between for the accommodation of two slices of bread to be toasted in each set, the adjacent end coils of adjacent sets being common to both. Bread or toast supporting trays are movably mounted between each adjacent pair of heating elements and suitable operating means and switches provided, whereby as each toasting tray is moved into toasting position the corresponding set of heating elements is excited automatically and as each toasting tray is moved out of toasting position, the corresponding set of heating elements is cut out. Adjustable time-controlled mechanism is provided for controlling the operation of the toasting trays and releasing the same for removal from toasting positions.

Figure 1:
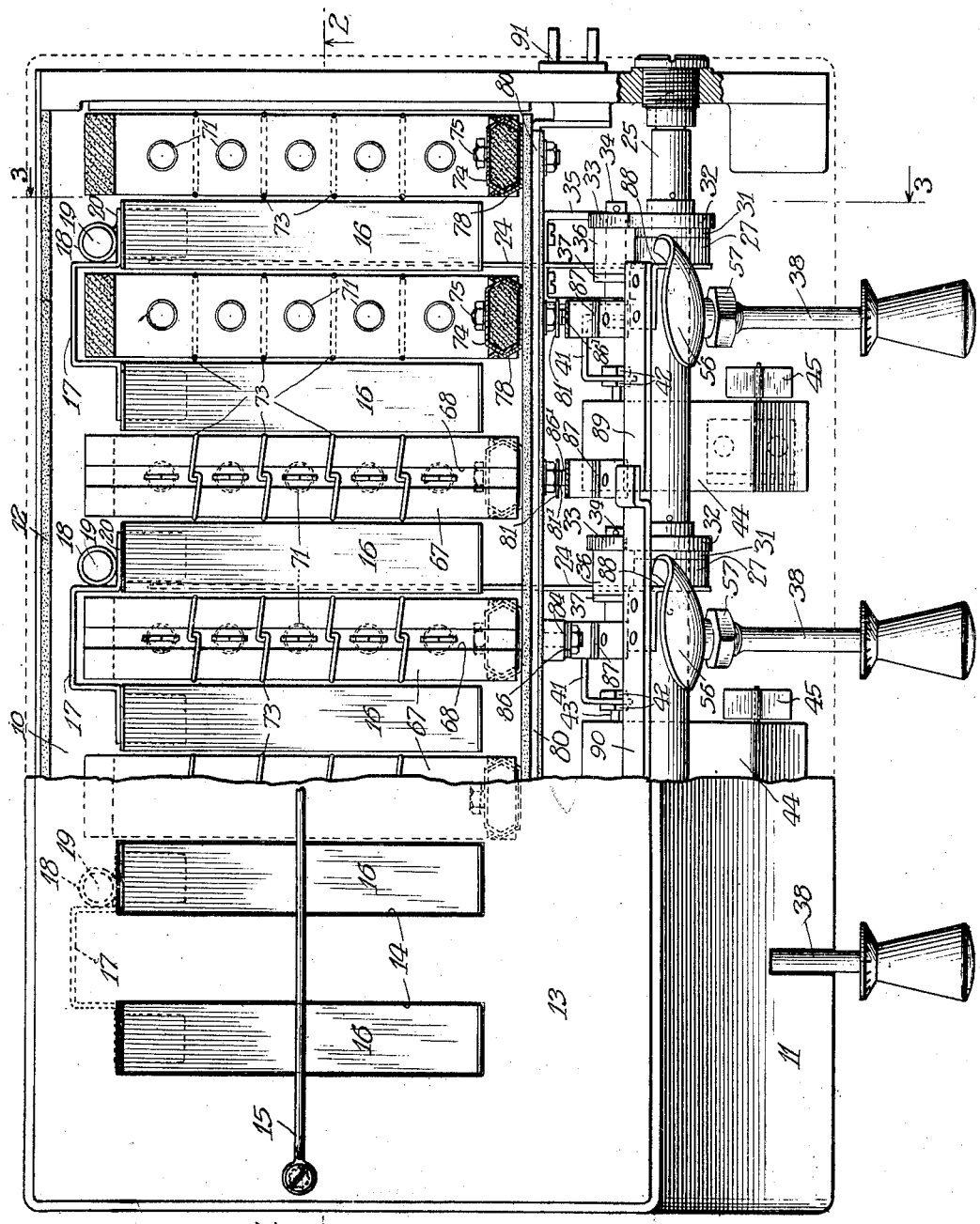
Figure 6:
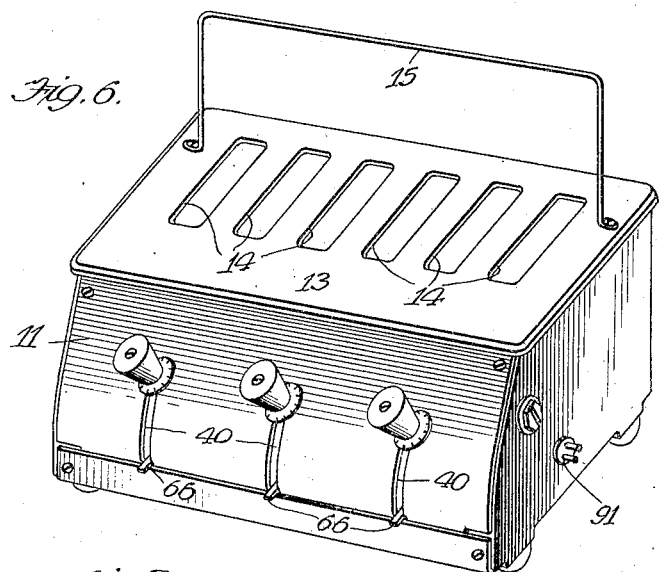
Figure 7:
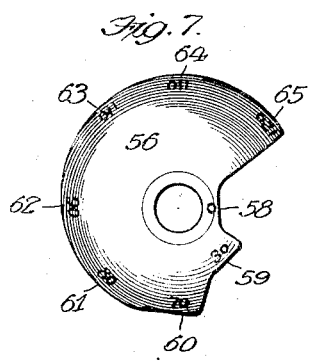
Figure 8:
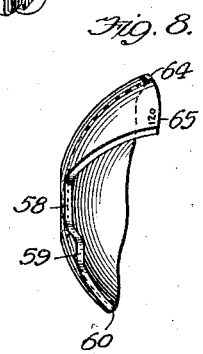

The invention will be best understood by reference to the accompanying drawings forming part of this specification and in which, Fig. 1 is a plan section taken substantially on line 1—1 of Fig. 2 and illustrating a device embodying the invention;

Fig. 2 a vertical longitudinal section taken substantially on line 2—2 of Fig. 1;

Fig. 3 a transverse vertical section taken substantially on line 3—3 of Fig. 1;

Fig. 3 a detail section taken substantially on line 3a—3a of Fig. 3;

Fig. 4 a front view of the device with the front plates removed and parts shown in section;

Fig. 5 a detail view of a trigger slide bar employed in the device;

Fig. 6 a perspective view of a complete device embodying the invention and shown in condition of use;

Fig. 7 a front view of an adjustable cam plate embodied in the device;

Fig. 8 a side view of said cam plate; and

Figure 9:
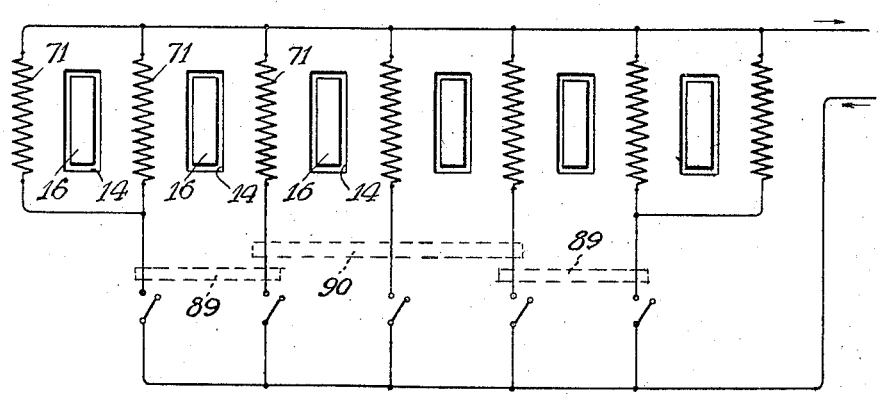

Fig. 9 a diagrammatic view illustrating the electric circuits embodied in the device.

The preferred form of construction as illustrated in the drawings, comprises a suitable casing or enclosure having a bottom member 10, a removable front plate 11, a removable rear plate 12 and a removable top plate 13. The top plate 13 is provided with a plurality of toasting slots 14, through which the slices of bread and toast may be inserted and removed. A guard wire 15 is arranged, as shown, over the slots 14 to prevent the toasted slices from being projected or thrown forcibly from the device in the discharging operation.

Arranged under each of the slots 14 is a toasting tray 16, said toasting trays being connected together in pairs by cross yokes or brackets 17 at the rear, as shown. Each yoke 17 is provided with a guide sleeve 18 sliding on a vertical guide rod 19, and whereby each pair of trays 16 is mounted for free vertical movement.

Each guide sleeve 18 carries a forwardly and downwardly extending bracket 20 having a depending lug 21 carrying a laterally extending pin 22 operating in a slot 23 in the rear end of an operating arm 24 pivoted to swing free on a cross shaft or rod 25 at the forward end of the device. The arrangement is such that by rocking the different arms 24 each yoke and its corresponding pair of toast trays will be depressed on the corresponding guide rod 19. Applied to each operating arm 24 is a coil spring 26 arranged to hold each arm and the corresponding pair of toasting trays yieldingly in elevated positions, as will be readily understood.

It will also be readily understood that by turning the arms 24 downwardly against the force of the spring 26, the corresponding pair of toasting trays may be depressed.

Each of the arms 24 is loosely mounted on the rod or shaft 25 and secured to a side of each thereof is a hub 27 having a notch 28 therein providing a stop shoulder 29 to engage a lug 30 on a hub 31 on a segmental gear 32 also loosely mounted on the shaft 25, as shown. The arrangement is such that with the parts in depressed position, indicated in Fig. 3, each segmental gear 32 may be turned counter-clockwise without affecting the corresponding operating arm 24 but, when the corresponding operating arm 24 is in raised or elevated position, rocking of the segmental gear in the opposite direction, or clockwise will cause depression of said arm and the corresponding pair of toasting trays. Each segmental gear 32 meshes with a companion segmental gear 33 fixed to a sleeve 36 mounted to turn on a shaft 34, which has reduced ends which engage bearings in brackets 35 rigidly secured to a fixed part of the machine frame, as best shown in Figs. 3 and 4. Also secured to said sleeve 36 so as to turn therewith is an angle bracket 37, rotatably secured in the outer leg of which is an operating handle 38, said handle being held in position by a nut 39 threaded to the end of said handle, which is reduced in diameter and extends through a hole in said bracket. Each operating handle 38 operates freely through a corresponding slot 40 in the front plate 11 of the device. By this arrangement, by swinging each of the handles 38 downwardly in its corresponding slot 40, the corresponding operating arm 24 may be rocked downwardly and the corresponding pair of toasting trays 16 may be depressed and thus carry a pair of bread slices deposited through slots 14 downwardly into the casing for toasting, as will be presently explained.

The lost motion provided between each segmental gear 32 and its corresponding arm 24 permits of idle return movement of the corresponding handle 38 without disturbing the corresponding arm 24 or breaking its connections, and said operating handles 38 are adapted to be maintained yieldingly in raised or retracted positions by springs which connect the segmental gears 33 with fixed pins secured in the frame of the toaster, as shown.

With the described construction, it is obvious that when the arms 24 and handles 38 are both in their extreme raised positions, the lugs 30 will be in contact with both shoulders 28 and 29, in which positions depression of the handles 38, through the segmental gears 32 and 33 and the lug 30, will operate to depress the arms 24 controlled by said handles, respectively.

In accordance with common practice the toasting interval—during which the slices on the trays 16 will be exposed in the heating elements—is controlled by suitable timing means indicated at 44 and which may exemplify any desired form of time-control mechanism. As shown, the shaft 43 of each time-control means is operatively connected with a shaft 34 so that they will rotate together. As shown, connected shafts 34 and 43 are in substantial axial alignment with each other and the means for connecting them consists of coupling members 41, one end of each of which is mounted to turn on the reduced end of the shaft 34 proximate the time-control means 44—being confined between a shoulder on said shaft and a bracket 35, and the opposite end of which is coupled to the corresponding shaft 43. Simple means for this purpose consists of a lug on said coupling member 41 provided with a hole to receive a head 42 on the shaft 43, said hole and head being shaped and proportioned to prevent turning movement of said head in said hole.

Formed on each bracket 41 is a trip-arm 46, the lower end 47 of which co-operates with the end shoulder 48 of a slot 49, see Fig. 5, provided in a trigger bar 50 slidably mounted on the bottom 10 of the casing. A tension spring 51 is mounted, as shown, to hold the trigger bar 50 yieldingly in retracted position. The rear end 52 of the trigger bar 50 co-operates with a shoulder 53 on the rear end of the corresponding operating arm 24 which is also provided with a beveled nose 54, as best shown in Fig. 3. The arrangement is such that upon depression of each operating arm 24, as above described, the corresponding beveled nose 54 engages the rear end of the corresponding trigger bar 50, forcing the same forwardly against the resistance of the spring 51 until said trigger automatically engages the shoulder 53, thus automatically locking the corresponding operating arm 24 and corresponding pair of toasting trays 16 in depressed positions.

Each of the trip arms 46 is provided with an upwardly extending finger 55 set in the path of a cam plate 56 mounted to rotate freely with the corresponding handle lever 38, being adjustably clamped in position thereon by means of the clamping nut 57.

As best shown in Figs. 7 and 8, each of the cam plates 56 is provided with operating shoulders or edges co-operating with the corresponding trip arm 46. These operating edges or shoulders of the cam plate 56 are marked on the drawings, respectively, see Figs. 7 and 8, with the numerals 58, 59, 60, 61, 62, 63, 64 and 65, and it will be noted that each of said edges or shoulders is located a different radial distance from the axis of the handle 38, so that when the cam plate is adjusted angularly or rotatably with the handle 38 and a different shoulder brought into position to contact with the corresponding finger 55 on the trip arm 46, means for swinging said trip arm through a different angle of adjustment is provided. Thus upon downward swinging of each handle lever 38 in depressing and setting of the corresponding pair of toasting trays 16, the corresponding finger 55 on the trip arm 46 will be engaged and said arm 46 turned back by the corresponding shoulder or edge on the cam plate 56.

The shoulder or edge 58 is in zero position and contacts with the finger 55 only at the extreme lowermost position of the handle lever 38, so that when the cam plate 56 is adjusted, as indicated in Fig. 3, the handle lever 38 may be swung downwardly to the full limit of its movement without affecting the corresponding trip arm 46. This is the adjustment for rendering this section of the machine manual or non-automatic in operation, if desired, and necessitates that the operating lever 38 be held in depressed position during the toasting period.

At each other adjustment of the cam plate 56 the trip arm will be operated by being swung downwardly and rearwardly through an angle depending upon which of the shoulders of the cam plate contacts with the finger 55. If the shoulder 59 is set to contact with the finger 55 the backward swing of the trip arm 46 will be comparatively slight, but if the shoulder 60 is set for such contact, the backward swing of the trip arm 46 will be comparatively great or over twice that caused by the shoulder 59. Thus for each of the other shoulders or edges on the cam plate the backward swing of the trip arm 46 will vary according to the radial distance of the engaging shoulder from the axis of the handle 38 as will be readily understood.

This arrangement furnishes a simple and convenient means for timing the action of the apparatus in toasting the slices of bread on the trays 16.

As previously explained, each trip-arm 46 turns freely on its shaft 34, but positively engages the shaft 43 of the time-control mechanism, so that depression of a handle 38 will operate to wind or set said time-control mechanism.

Upon release of the handle 38, the same being free to swing upwardly, the trip arm 46 commences to return through the action of the time-control mechanism and, obviously, the time of return will depend upon the extent of the angle through which it has been swung and the extent of the angle of swing depends upon the shoulder of the cam plate 56 which has been adjusted to contact with the finger 55, as explained above. Thus, it will be observed, that the time which must elapse before the trip arm 46 returns to original position in contact with the shoulder 48 of the trigger bar 50 depends upon the adjustment of the cam plate 56 and this adjustment may be varied as desired.

As soon as the trip arm 46 engages the shoulder 48 the trigger bar 50 is moved forward to release the corresponding arm 24 which will then be swung upwardly under the influence of the corresponding spring 26 and the toasted slices of bread completely removed from toasting positions and projected upwardly through the slots 14.

A trip lever 66 is also pivoted on each shaft 34 projecting outwardly through each slot 40 under each handle 38 and whereby, when desired, the operator may trip the corresponding arm 24 to expel the corresponding pair of slices of toast should occasion require the same.

The heating elements for toasting the bread are electrical heating coils. Each of said heating elements consists of a rectangular frame 67 of porcelain or other insulating or heat resisting material. The top and bottom bars of the frame 67 are provided, respectively, with longitudinal grooves 68 and 69 and openings leading from said grooves through said bars for the accommodation of mounting or supporting elements 70 on which the electrical heating coils 71 are supported, as shown. Each frame 67 is provided at the bottom at the forward and rearward edges with depending lugs or feet 72 providing a notch or space for the reception of guard wires 73 which are passed around each frame, as indicated, and reinforce the same and protect the heating coils against actual contact with the bread to be toasted.

Suitable positioning or guide pins 67' are provided on the bottom 10 of the casing to position the rear ends of the different frames 67 by engaging the corresponding bottom grooves 69, as shown.

The forward bar of each of the frames 67 carries two electrical contact clips 74, as shown, see Fig. 3a. Each contact clip 74 is secured in place by means of a bolt 75 and one end of the corresponding heating coil 71 is connected by the lead wires 76 with the uppermost clip 74 and the other end of said coil is connected by the lead wire 77 with the lowermost clip 74, as best shown in Fig. 3, such arrangement furnishing a simple and convenient means for supplying current to each heating coil.

Two spring clamping jaws 78 are secured by bolts 79 to a central vertical partition 80 in the casing, said clamping jaws 78 being arranged in vertically registering pairs to receive the contact clips 74 of each frame 67, as indicated. The partition 80 is provided with suitable slots 80' to permit free operation of the arms 24 therethrough. Each of the intermediate lowermost clamping jaws 78 except the end ones is secured by its bolt 79 to a corresponding spring contact or switch member 81 projecting upwardly therefrom and provided at its upper end with a contact piece 81', as shown, there being one of the spring contact switches 81 for each of the intermediate heating frames employed in the device. The lowermost clamping jaw for each end frame is connected by a wire 78' with the adjacent jaw thus placing the two end heating coils in connection with each lowermost end clamping jaw. Each of the uppermost clamping jaws 78 is connected by its bolt 79 with a corresponding metal bus bar 82 extending along the front face of the partition 80 which is of insulating material.

The bus bar 82 is connected at one end by a wire 83 with an electrical plug connection 91 on a side of the casing, as best indicated in Figs. 4 and 6. Another bus bar 84 is arranged along the top of the partition 80 and extends outwardly slightly therefrom as shown, see Fig. 3. said bus bar 84 being also connected by a wire 85 with the plug contact 91, as indicated.

A plurality of spring switch bars 86 depend from the bus bar 84, there being one of the switch bars 86 for each of the switch bars 81 and co-operating therewith. Each switch bar 86 is provided with a contact 86' co-operating with the corresponding contact 81', as best shown in Fig. 3, and whereby when said switch bars are in contact electric current will be furnished to the corresponding heating coils, as will be readily understood. Each switch bar 86 is provided at its lower end with a forwardly and upwardly turned arm carrying a piece 87 of insulating material. Each of the operating arms 24 is provided with an upwardly extending arm 88. Each of the arms 88 at the ends of the device carry cross bars 89 of insulating material and of a length sufficient to span the adjoining pair of switch bars 86, as best shown in Fig. 4.

The central arm 88 carries a cross bar 90 which spans and is adapted to contact with the three intermediate switch bars 86, also, as shown in Fig. 4. By this arrangement it will be noted that upon operation of either of the end arms 24 the corresponding pair of end switches 86 will be closed, and that upon operation of the central or intermediate arm 24 the three central or intermediate switch bars 86 will be closed.

The wiring diagram is illustrated diagrammatically in Fig. 9, from which it will be noted that the lowermost clamping jaws 78 for each end pair of heating elements are connected with the corresponding end switch bar 81, the intermediate heating elements being connected individually with the corresponding switch bars 81. The arrangement is such that upon depression of each of the end handles 38 the two corresponding end switch bars 86 will be operated by the corresponding bar 89 to close circuits through the corresponding three heating elements, so that heat will be supplied on both sides of the corresponding toasting trays.

When the central or intermediate handle 38 is depressed the three central switch bars 86 will be correspondingly forced into contact with the corresponding switch bars 81, thus closing circuits through the corresponding three heating coils. It will be noted, however, that the arrangement is such that the innermost coil for each end pair of toasting trays is also the outermost coil for the central or intermediate pair of toasting trays, so that the adjacent end heating coils of adjacent sets of coils are common to both sets.

The overlapping arrangement of the bars 89 and 90 is such that the corresponding switch bars 86 will always be held in closed positions as long as the corresponding coils are in operation and independently of the other bars and circuits.

Thus when the trip arm 46 for any one of the handles 38 arrives at the end of its backward swing and releases the corresponding operating arm 24, as explained above, and said operating arm swings upwardly the circuits for the corresponding heating coils will ordinarily be broken unless an adjacent set of coils is in operation, in which latter case the circuit for the common heating coil will not be broken. This action is due to the overlapping relations of the bars 89 and 90, as indicated in Fig. 4, and whereby the bar 90 is free to hold the three central switch bars 86 closed independently of the bars 89. Or in other words, the heating coils are thus arranged in adjacent sets of three but the adjacent sets comprise end members common to both.

The specific form of switch arrangements for the different coils is the simplest possible one for the purpose and it may be found in practice that there will be some spark or arcing when the contacts 81' and 86 are separated. If this occurs it may be readily corrected by substituting for the switch arrangement illustrated an equivalent arrangement designed especially to prevent such sparking upon breaking of the circuits. Such a switch arrangement is a well known equivalent for the switch arrangement illustrated and requires no further description here.

By means of the arrangement disclosed a simple and effective toaster is provided which is compact in construction, and flexible and economical in operation.

The device disclosed embodies the sectional idea and can be built in any desired capacity with any number of sections or sets of coils, each being independent of all others. Thus if one section fails the others may continue to work until repairs can be made and the reliability of the apparatus is thereby greatly increased.

Vital parts, such as motors and heating coils are provided so as to be readily detachable and releasable to facilitate quick repairs. The heaters are all arranged in one line and the intermediate heaters toast on both sides.

The switches for the heaters are so interlocked that no heater operates longer than is absolutely necessary and after the toasting operation of any pair of bread slices is completed the bread slices are completely removed from toasting positions thereby preventing overtoasting or burning due to the possible continued operation of a common heating coil, whose operation may not be discontinued when an adjacent set of heaters is discontinued. The discontinuation of the toasting operation of each set of heaters or coils is either automatic or manually controlled as desired. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details disclosed, but desire to avail myself of such variations and modifications as come within the scope of the appended claims.

I claim:

1. A toaster comprising heating means; a slice support movable into and out of toasting position in said heating means; a manually operable lever for moving said support into toasting position; a spring for moving said support out of toasting position; a spring held trigger mechanism for locking said support in toasting position; a swinging trip arm arranged to engage said trigger mechanism for releasing said slice support; a cam rotatably adjustable on said lever, the radial dimension of which varies progressively, said cam cooperating with said trip arm to engage and swing the same through varying angles; motor spring mechanism operatively connected to said trip arm, whereby turning movement of said trip arm by said cam will energize said motor mechanism and said energized motor when released will return said trip arm to operate said trigger mechanism to release said toasting support.

2. A toaster comprising a plurality of heating elements arranged with toasting spaces between them, said heating elements being arranged in adjacent sets, each set comprising a plurality of elements adjacently arranged, adjacent end elements of adjacent sets being common to both sets, a set of slice supports movable into and out of position between the heating elements of each set, means for maintaining said heating elements normally passive and the slice supports yieldingly withdrawn from toasting position, a manually operable lever for each set of heating elements, and separate means actuated by manipulation of each of said levers for simultaneously moving the set of slice supports mounted in association with the set of heating elements to which a motivating lever is applied into toasting position and for connecting the heating elements thereof to a source of energy, and separate locking means for securing the set of slice supports associated with different sets of heating elements in toasting position and for continuing excitation of said heating elements, and variable time-controlled tripping means for releasing said slice supports and disconnecting said heating elements, each operating lever and time-controlled tripping means being associated with its own set of heating elements only.

3. A toaster comprising a plurality of heating elements arranged with toasting space between them, said heating elements being arranged in adjacent sets, each set comprising a plurality of elements adjacently arranged and adjacent end elements of adjacent sets being common to both sets, a set of slice supports movable into and out of position between the heating elements of each set, means for maintaining said heating elements normally passive and the slice support yieldingly withdrawn from toasting position, a manually operable lever for each set of heating elements, and separate means actuated by manipulation of each of said levers for simultaneously moving the set of slice supports mounted in association with the set of heating elements to which a motivating lever is applied into toasting position, and for exciting the heating elements thereof, and separate locking means for securing the set of slice supports associated with different sets of heating elements in toasting position, and for connecting the heating elements thereof to a source of energy, and variable time-controlled tripping mechanism for releasing said slice supports, each operating lever and time-controlled tripping means being associated with its own set of slice supports only.

4. A toaster comprising heating means, a slice support movable into and out of position in said heating means, means for maintaining said heating means normally passive and the slice support yieldingly withdrawn therefrom, locking means for securing said slice support in position in the heating means, variable time-controlled means for tripping said locking means to release the slice support, a single manually operable lever and means actuated by and requiring a full stroke thereof of uniform length for all time sets for moving the slice support into position in the heating means and for effecting engagement of the locking means for securing the slice support in position in the heating means and for exciting said heating means and for energizing the time-controlled tripping means.

5. A toaster comprising heating means, a slice support movable into and out of position in said heating means, means for maintaining said heating means normally passive and the slice support yieldingly withdrawn therefrom, locking means for securing said slice support in position in the heating means, variable time-controlled means for tripping said locking means to release the slice support, a single manually operable lever and means actuated by and requiring a full-stroke thereof of uniform length for all time sets for moving the slice support into position in the heating means and acting thereon throughout its stroke, and for effecting engagement of the locking means for securing the slice support in position in the heating means and for exciting said heating means and for energizing the time controlled tripping means.

ROBERT SCHLEMM.